US008196460B2

(12) United States Patent
Barnikow et al.

(10) Patent No.: US 8,196,460 B2
(45) **Date of Patent: *Jun. 12, 2012**

(54) METHOD AND DEVICE FOR MONITORING AN EXHAUST GAS PROBE

(75) Inventors: Stefan Barnikow, Bad Abbach (DE); Michaela Schneider, Wiesenfelden (DE); Norbert Sieber, Obermichelbach (DE)

(73) Assignee: Continental Automotive GmbH, Hannover (DE)

( * ) Notice: Subject to any disclaimer, the term of this patent is extended or adjusted under 35 U.S.C. 154(b) by 400 days.

This patent is subject to a terminal disclaimer.

(21) Appl. No.: 12/444,228

(22) PCT Filed: Oct. 2, 2007

(86) PCT No.: PCT/EP2007/060461

§ 371 (c)(1),
(2), (4) Date: Oct. 16, 2009

(87) PCT Pub. No.: WO2008/040732

PCT Pub. Date: Apr. 10, 2008

(65) Prior Publication Data

US 2010/0037683 A1 Feb. 18, 2010

(30) Foreign Application Priority Data

Oct. 5, 2006 (DE) ........................ 10 2006 047 188

(51) Int. Cl.
*G01M 15/10* (2006.01)

(52) U.S. Cl. .................................................... 73/114.69

(58) Field of Classification Search ............... 73/114.69, 73/114.71, 114.72, 114.73, 114.77
See application file for complete search history.

(56) References Cited

U.S. PATENT DOCUMENTS

| | | | | |
|---|---|---|---|---|
| 5,179,924 | A | 1/1993 | Manaka | |
| 7,387,011 | B2 * | 6/2008 | Fujiki et al. | 73/23.32 |
| 7,874,285 | B2 * | 1/2011 | Barnikow et al. | 123/688 |
| 2005/0056266 | A1 | 3/2005 | Ikemoto | |
| 2008/0083211 | A1 * | 4/2008 | Barnikow et al. | 60/273 |
| 2009/0100922 | A1 * | 4/2009 | Korbel et al. | 73/114.72 |

FOREIGN PATENT DOCUMENTS

| | | | |
|---|---|---|---|
| EP | 0402953 | A2 | 12/1990 |
| EP | 0616121 | A1 | 9/1994 |
| EP | 0796988 | A2 | 9/1997 |
| EP | 1437501 | A1 | 7/2004 |

* cited by examiner

*Primary Examiner* — Eric S McCall
(74) *Attorney, Agent, or Firm* — King & Spalding L.L.P.

(57) ABSTRACT

In relation to a jump (SP_J_LR) from a lean air-to-fuel ratio to a richer air-to-fuel ratio, a measurement signal of the exhaust gas probe is detected after a predetermined lean-to-rich delay (t_R) as a lean-to-rich signal value (SV_LR) and is placed in relation to a lean-to-reference signal value (L_REF). In relation to a jump (SP_J_RL) from a richer air-to-fuel ratio to a leaner air-to-fuel ratio, the procedure is performed equivalently. Depending on the lean-to-rich and lean-to-rich signal value put in relation, either an asymmetrically aged or non-asymmetrically aged exhaust gas probe is detected.

20 Claims, 7 Drawing Sheets

METHOD AND DEVICE FOR MONITORING AN EXHAUST GAS PROBE

CROSS-REFERENCE TO RELATED APPLICATIONS

This application is a U.S. National Stage Application of International Application No. PCT/EP2007/060461 filed Oct. 2, 2007, which designates the United States of America, and claims priority to German Application No. 10 2006 047 188.1 filed Oct. 5, 2006, the contents of which are hereby incorporated by reference in their entirety.

TECHNICAL FIELD

The invention relates to a method and device for monitoring an exhaust gas probe, which is disposed in an exhaust gas tract of an internal combustion engine.

BACKGROUND

Increasingly stringent legislation governing permissible pollutant emissions from motor vehicles, in which internal combustion engines are disposed, requires pollutant emissions to be kept as low as possible during operation of the internal combustion engine. This can be achieved on the one hand by reducing the pollutant emissions resulting during combustion of the air/fuel mixture in the respective cylinder of the internal combustion engine.

On the other hand exhaust gas post-treatment systems are deployed in internal combustion engines to convert the pollutant emissions produced in the respective cylinders during the combustion process of the air/fuel mixture to harmless substances.

Catalytic converters are used for this purpose, which convert carbon monoxide, hydrocarbons and nitrogen oxides to harmless substances.

Both the specific influencing of the production of pollutant emissions during combustion and the conversion of the pollutant components by a catalytic converter with a high level of efficiency require very precise setting of the air/fuel ratio in the respective cylinder.

Known from the technical publication titled "Handbuch Verbrennungsmotor" (appearing in English as "Internal Combustion Engine Handbook"), edited by Richard van Basshuysen and Fred Schäfer, 2nd edition, published by Vieweg & Sohn Verlagsgesellschaft mbH, June 2002, pages 559-561, is a linear lambda regulator with a linear lambda probe, which is disposed upstream of an exhaust gas catalytic converter, and a binary lambda probe, which is disposed downstream of the exhaust gas catalytic converter. A setpoint lambda value is filtered by means of a filter, taking into account the gas travel times and sensor response. The setpoint lambda value thus filtered is the controlled variable of a $PIII^2D$ lambda regulator, the manipulated variable of which is an injected quantity correction.

Also known from the technical publication titled "Handbuch Verbrennungsmotor" (appearing in English as "Internal Combustion Engine Handbook"), edited by Richard van Basshuysen and Fred Schäfer, 2nd edition, published by Vieweg & Sohn Verlagsgesellschaft mbH, June 2002, pages 559-561, is a binary lambda regulator with a binary lambda probe, which is disposed upstream of the exhaust gas catalytic converter. The binary lambda regulator comprises a PI regulator, with the P and I components being stored in engine characteristic maps relating to engine speed and load. With binary lambda regulation the excitation of the catalytic converter, also referred to as lambda fluctuation, results implicitly from second point regulation. The amplitude of the lambda fluctuation is set at around three percent.

Special significance attaches to the lambda probe(s) in respect of lambda regulation. In this context it is necessary, for example due to statutory regulations, to monitor the lambda probe in an appropriate manner.

SUMMARY

According to various embodiments, a method and device for monitoring an exhaust gas probe can be created, which allow particularly simple identification of asymmetrical aging of the exhaust gas probe.

According to an embodiment, in a method for monitoring an exhaust gas probe, which is disposed in an exhaust gas tract of an internal combustion engine,—in relation to a jump of a variable influencing an air/fuel ratio from a leaner air/fuel ratio to a richer air/fuel ratio, a measuring signal of the exhaust gas probe can be captured after a predetermined lean to rich delay period as a lean to rich signal value and can be related to a lean reference signal value, which is captured in correlation with the jump of the variable influencing the air/fuel ratio from a leaner air/fuel ratio to a richer air/fuel ratio,—in relation to a jump of the variable influencing an air/fuel ratio from a richer air/fuel ratio to a leaner air/fuel ratio, a measuring signal of the exhaust gas probe can be captured after a predetermined rich to lean delay period as a rich to lean signal value and can be related to a rich reference signal value, which is captured in correlation with the jump of the variable influencing the air/fuel ratio from a richer air/fuel ratio to a leaner air/fuel ratio, and—either an asymmetrically aged or a non-asymmetrically aged exhaust gas probe can be identified as a function of the related lean to rich and rich to lean signal values.

According to a further embodiment, the related lean to rich and rich to lean signal values can be compared with predetermined lean to rich and/or rich to lean threshold values and either an asymmetrically aged or a non-asymmetrically aged exhaust gas probe can be identified as a function of the comparisons. According to a further embodiment, the lean to rich delay period and the rich to lean delay period can be predetermined as a function of a load and/or a rotational speed. According to a further embodiment, the lean to rich and/or rich to lean threshold values can be determined as a function of the respective height of the jump of the variable influencing the air/fuel ratio from a leaner air/fuel ratio to a richer air/fuel ratio and/or the jump of the variable influencing the air/fuel ratio from a richer air/fuel ratio to a leaner air/fuel ratio. According to a further embodiment,—a setpoint value of the air/fuel ratio in a combustion chamber can be modulated by means of a forced excitation signal,—a mass of fuel to be metered in can be determined in the context of a lambda regulation as a function of the modulated setpoint value and an injection valve can be activated according to the mass of fuel to be metered in,—the jump of the variable influencing the air/fuel ratio from a leaner air/fuel ratio to a richer air/fuel ratio can be a jump of the modulated setpoint value from a lean air/fuel ratio to a rich air/fuel ratio,—the jump of the variable influencing the air/fuel ratio from a richer air/fuel ratio to a leaner air/fuel ratio can be a jump of the modulated setpoint value from a rich air/fuel ratio to a lean air/fuel ratio.

According to a further embodiment, as a function of a trim controller diagnosis, a suspicion marker for an asymmetrical aging of the exhaust gas probe can be allocated either a true value or a false value and if the suspicion marker has the true value, the steps of capturing and relating the lean to rich and rich to lean signal values and as a function of this identifying an asymmetrically aged or a non-asymmetrically aged exhaust gas probe can be carried out. According to a further embodiment, an amplitude of the forced excitation signal can be increased to carry out the steps of capturing and relating the lean to rich and rich to lean signal values.

According to another embodiment, in a method for monitoring an exhaust gas probe, which is disposed in an exhaust gas tract of an internal combustion engine,—a mass of fuel to be metered in can be determined as a function of the actuating signal of a binary lambda regulator and the injection valve can be activated according to the mass of fuel to be metered in,—in relation to a jump of the actuating signal of the binary lambda regulator from a lean air/fuel ratio to a rich air/fuel ratio, a signal value of the exhaust gas probe can be captured after a predetermined lean to rich delay period as a lean to rich signal value and can be related to a lean reference signal value, which is captured in correlation with the jump of the actuating signal of the binary lambda regulator from a lean air/fuel ratio to a rich air/fuel ratio,—in relation to a jump of the actuating signal of the binary lambda regulator from a rich air/fuel ratio to a lean air/fuel ratio, a signal value of the exhaust gas probe can be captured after a predetermined rich to lean delay period as a rich to lean signal value and can be related to a rich reference signal value of the measuring signal, which is captured in correlation with the jump of the actuating signal of the binary lambda regulator from a rich air/fuel ratio to a lean air/fuel ratio, and—either an asymmetrically aged or a non-asymmetrically aged exhaust gas probe can be identified as a function of the related lean to rich and rich to lean signal values.

According to a further embodiment, the related lean to rich and rich to lean signal values can be compared with predetermined lean to rich and/or rich to lean threshold values and either an asymmetrically aged or a non-asymmetrically aged exhaust gas probe can be identified as a function of the comparisons. According to a further embodiment, the lean to rich delay period and the rich to lean delay period can be predetermined as a function of a load and/or a rotational speed. According to a further embodiment, as a function of a trim controller diagnosis, a suspicion marker for an asymmetrical aging of the exhaust gas probe can be allocated either a true value or a false value and if the suspicion marker has the true value, the steps of capturing and relating the lean to rich and rich to lean signal values and as a function of this identifying an asymmetrical aging or a non-asymmetrical aging can be carried out. According to a further embodiment, at least one of the control parameters of the binary lambda regulator can be changed to carry out the steps of capturing and relating the lean to rich and rich to lean signal values.

According to yet another embodiment, a device for monitoring an exhaust gas probe, which is disposed in an exhaust gas tract of an internal combustion engine, may be configured:—in relation to a jump of a variable influencing an air/fuel ratio from a leaner air/fuel ratio to a richer air/fuel ratio, to capture a measuring signal of the exhaust gas probe after a predetermined lean to rich delay period as a lean to rich signal value and relate it to a lean reference signal value, which is captured in correlation with the jump of the variable influencing the air/fuel ratio from a leaner air/fuel ratio to a richer air/fuel ratio,—in relation to a jump of the variable influencing an air/fuel ratio from a richer air/fuel ratio to a leaner air/fuel ratio, to capture a measuring signal of the exhaust gas probe after a predetermined rich to lean delay period as a rich to lean signal value and relate it to a rich reference signal value, which is captured in correlation with the jump of the variable influencing the air/fuel ratio from a richer air/fuel ratio to a leaner air/fuel ratio, and—to identify either an asymmetrically aged or a non-asymmetrically aged exhaust gas probe as a function of the related lean to rich and rich to lean signal values.

According to yet another embodiment, a device for monitoring an exhaust gas probe, which is disposed in an exhaust gas tract of an internal combustion engine, may be configured:—to determine a mass of fuel to be metered in as a function of the actuating signal of a binary lambda regulator and to activate the injection valve according to the mass of fuel to be metered in,—in relation to a jump of the actuating signal of the binary lambda regulator from a lean air/fuel ratio to a rich air/fuel ratio, to capture a signal value of the exhaust gas probe after a predetermined lean to rich delay period as a lean to rich signal value and relate it to a lean reference signal value, which is captured in correlation with the jump of the actuating signal of the binary lambda regulator from a lean air/fuel ratio to a rich air/fuel ratio,—in relation to a jump of the actuating signal of the binary lambda regulator from a rich air/fuel ratio to a lean air/fuel ratio, to capture a signal value of the exhaust gas probe after a predetermined rich to lean delay period as a rich to lean signal value and relate it to a rich reference signal value of the measuring signal, which is captured in correlation with the jump of the actuating signal of the binary lambda regulator from a rich air/fuel ratio to a lean air/fuel ratio,—to identify either an asymmetrically aged or a non-asymmetrically aged exhaust gas probe as a function of the related lean to rich and rich to lean signal values.

BRIEF DESCRIPTION OF THE DRAWINGS

Exemplary embodiments of the invention are described in more detail below with reference to the schematic drawings, in which.

Elements having the same design or function have been assigned the same reference characters in all the figures.

DETAILED DESCRIPTION

Figure 1:
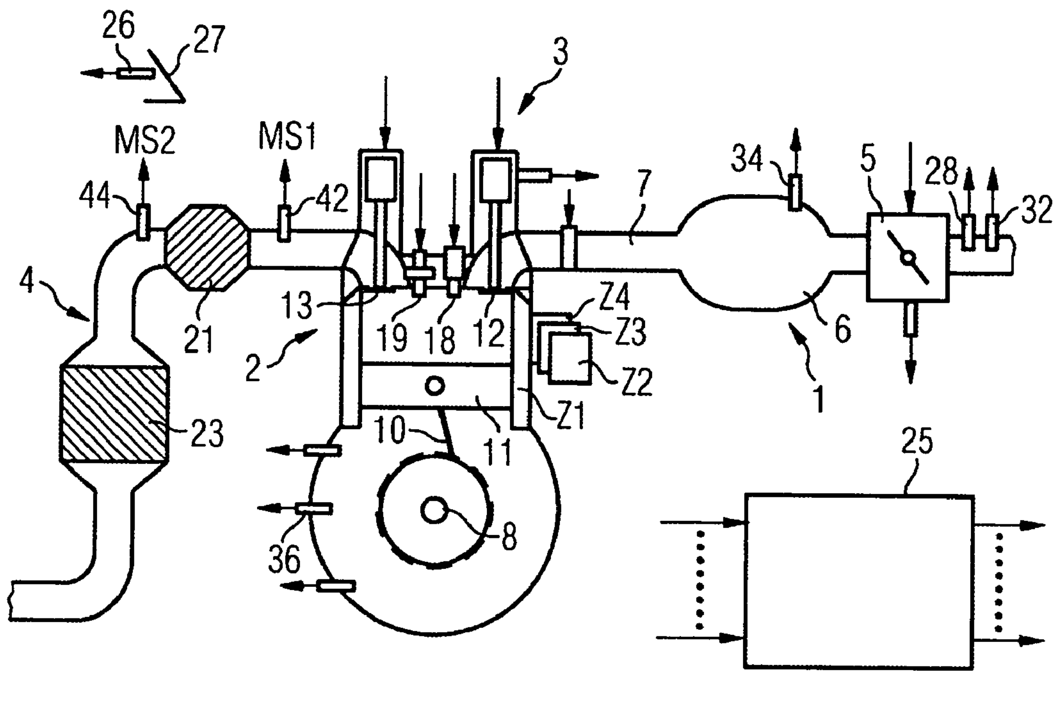
FIG. 1 shows an internal combustion engine with a control device.

According to a first aspect, in a method and corresponding device for monitoring an exhaust gas probe, which is disposed in an exhaust gas tract of an internal combustion engine, in relation to a jump of a variable influencing an air/fuel ratio from a leaner air/fuel ratio to a richer air/fuel ratio, a measuring signal of the exhaust gas probe is captured after a predetermined lean to rich delay period as a lean to rich signal value and related to a lean reference signal value, which is captured in correlation with the jump of the modulated setpoint value from a lean air/fuel ratio to a rich air/fuel ratio.

It is of course possible in this context to take into account gas travel times, which occur in the internal combustion engine from the actual metering of a fuel mass into a combustion chamber of a respective cylinder until the respectively assigned exhaust gas packet reaches the respective exhaust gas probe. It is also possible in this context optionally to take into account a storage response of an exhaust gas catalytic converter in the exhaust gas tract or a dynamic response of the intake tract of the internal combustion engine in respect of a supply of air to the respective combustion chamber.

In relation to a jump of the variable influencing an air/fuel ratio from a richer air/fuel ratio to a leaner air/fuel ratio, a measuring signal of the exhaust gas probe is captured after a predetermined rich to lean delay period as a rich to lean signal value and related to a rich reference signal value. The rich reference signal is captured in correlation with the jump of the modulated setpoint value from a rich air/fuel ratio to a lean air/fuel ratio.

The correlation can for example preferably involve the measuring signal assigned to the exhaust gas probe being assigned to the reference signal value immediately before the respective jump or the minimum or maximum measuring signal that occurs between the respective jump and the jump preceding it being assigned.

It is of course possible in this context to take into account gas travel times, which occur in the internal combustion engine from the actual metering of a fuel mass into a combustion chamber of a respective cylinder until the respectively assigned exhaust gas packet reaches the respective exhaust gas probe. It is also possible in this context optionally to take into account a storage response of an exhaust gas catalytic converter in the exhaust gas tract. Either an asymmetrically aged or a non-asymmetrically aged exhaust gas probe is identified as a function of the related lean to rich and rich to lean signal values. It is thus possible to identify a delay of the jump response of the measuring signal of the exhaust gas probe, which varies according to the direction of the jump, and to use this for diagnostic purposes for example.

Alternatively or additionally it is possible in principle to identify either a symmetrically aged or non-symmetrically aged exhaust gas probe as a function of the related lean to rich and rich to lean signal values. It is thus possible to identify an essentially identical delay of the jump response of the measuring signal of the exhaust gas probe regardless of the direction of the jump and to use this for diagnostic purposes for example.

According to an embodiment of the first aspect the related lean to rich and rich to lean signal values are compared with predetermined lean to rich and/or rich to lean threshold values and either an asymmetrically aged or a non-asymmetrically aged exhaust gas probe is identified as a function of the comparisons. This is particularly simple. It is also possible in principle to distinguish the direction in which the asymmetry is present—from a leaner air/fuel ratio to a richer air/fuel ratio or from a richer air/fuel ratio to a leaner air/fuel ratio.

According to a further embodiment of the first aspect the lean to rich delay period and the rich to lean delay period are predetermined as a function of a load and/or a rotational speed. This allows particularly reliable diagnosis over a broad operating range of the internal combustion engine. According to a further advantageous embodiment of the first aspect the lean to rich and/or rich to lean threshold values are determined as a function of the respective height of the jump of the variable influencing the air/fuel ratio from a leaner air/fuel ratio to a richer air/fuel ratio and/or the jump of the variable influencing the air/fuel ratio from a richer air/fuel ratio to a leaner air/fuel ratio. This allows particularly reliable diagnosis over a broad operating range of the internal combustion engine.

According to a further embodiment of the first aspect a setpoint value of the air/fuel ratio in a combustion chamber is modulated by means of a forced excitation signal. A mass of fuel to be metered in is determined in the context of a lambda regulation as a function of the modulated setpoint value and an injection valve is activated according to the mass of fuel to be metered in. The jump of the variable influencing the air/fuel ratio from a leaner air/fuel ratio to a richer air/fuel ratio is a jump of the modulated setpoint value from a lean air/fuel ratio to a rich air/fuel ratio. The jump of the variable influencing the air/fuel ratio from a richer air/fuel ratio to a leaner air/fuel ratio is a jump of the modulated setpoint value from a rich air/fuel ratio to a lean air/fuel ratio. This allows particularly simple implementation.

According to a further embodiment of the first aspect as a function of a trim controller diagnosis, a suspicion marker for an asymmetrical aging of the exhaust gas probe is allocated either a true value or a false value. If the suspicion marker has the true value, the steps of capturing and relating the lean to rich and rich to lean signal values and as a function of this identifying an asymmetrically aged or non-asymmetrically aged exhaust gas probe are carried out. This allows the information resulting in the context of the trim controller diagnosis to be utilized in a simple manner and identification of an asymmetrically aged or non-asymmetrically aged exhaust gas probe thus to be carried out in a directed manner. It also allows asymmetrical aging of the exhaust gas probe to be identified in particular very soon after its occurrence.

It is particularly advantageous in this context if an amplitude of the forced excitation signal is increased to carry out the steps of capturing and relating the lean to rich and rich to lean signal values. This allows a particularly high level of selectivity and robustness of the monitoring of the exhaust gas probe.

According to a second aspect, in a method and a corresponding device for monitoring an exhaust gas probe, which is disposed in an exhaust gas tract of an internal combustion engine, a mass of fuel to be metered in is determined as a function of the actuating signal of a binary lambda regulator and the injection valve is activated according to the mass of fuel to be metered in.

In relation to a jump of the actuating signal of the binary lambda regulator from a lean air/fuel ratio to a rich air/fuel ratio, a signal value of the exhaust gas probe is captured after a predetermined lean to rich delay period as a lean to rich signal value and related to a lean reference signal value. The lean reference signal value is captured in correlation with the jump of the actuating signal of the binary lambda regulator from a lean air/fuel ratio to a rich air/fuel ratio. The jump of the actuating signal of the binary lambda regulator from a lean air/fuel ratio to a rich air/fuel ratio thus results in an increasing enrichment of the air/fuel mixture in the combustion chamber of the respective cylinder.

In relation to a jump of the actuating signal of the binary lambda regulator from a rich air/fuel ratio to a lean air/fuel ratio, a signal value of the exhaust gas probe is captured after a predetermined rich to lean delay period as a rich to lean signal value and related to a rich reference signal value of the signal which is captured in correlation with the jump of the actuating signal of the binary lambda regulator from a rich air/fuel ratio to a lean air/fuel ratio.

Either an asymmetrically aged or a non-asymmetrically aged exhaust gas probe is identified as a function of the related lean to rich and rich to lean signal values.

As with the first aspect the advantages assigned to the first aspect can likewise be achieved with the second aspect as well. To this extent the second aspect also corresponds in respect of its advantageous embodiments to those of the first aspect. The same also applies to the assigned advantages.

According to one embodiment of the second aspect at least one of the control parameters of the binary lambda regulator is changed to carry out the steps of capturing and relating the lean to rich and rich to lean signal values. This allows a particularly high level of selectivity and robustness of the monitoring of the exhaust gas probe.

An internal combustion engine (FIG. 1) comprises an intake tract 1, an engine block 2, a cylinder head 3, and an exhaust gas tract 4. The intake tract 1 preferably comprises a throttle valve 5 as well as a manifold 6 and an intake pipe 7, which is ducted to a cylinder Z1 by way of an inlet duct into the engine block 2. The engine block 2 further comprises a crankshaft 8, which is coupled by way of a connecting rod 10 to the piston 11 of the cylinder Z1.

The cylinder head 3 comprises a valve drive having a gas inlet valve 12 and a gas outlet valve 13.

The cylinder head 3 further comprises an injection valve 18 and a spark plug 19. The injection valve 18 can alternatively also be disposed in the intake pipe 7.

Disposed in the exhaust gas tract 4 is an exhaust gas catalytic converter configured as a three-way catalytic converter 21. Preferably also disposed in the exhaust gas tract is a further exhaust gas catalytic converter configured as a NOx catalytic converter 23.

A control device 25 is provided which is assigned sensors which capture different measured variables and determine the value of the measured variable respectively. In addition to the measured variables, operating variables also include variables derived therefrom. As a function of at least one of the operating variables the control device 25 determines manipulated variables, which are then converted to one or more actuating signals for controlling the actuators by means of corresponding control drives. The control device 25 can also be referred to as a device for controlling the internal combustion engine or as a device for monitoring an exhaust gas probe.

The sensors are a pedal position indicator 26, which captures a position of a gas pedal 27, a mass air sensor 28, which captures a mass air flow upstream of the throttle valve 5, a first temperature sensor 32, which captures an intake air temperature, an intake pipe pressure sensor 34, which captures an intake pipe pressure in the manifold 6, a crankshaft angle sensor 36, which captures a crankshaft angle to which a rotational speed is then assigned.

Also provided is a first exhaust gas probe 42, which is disposed upstream of the three-way catalytic converter 21 or inside the three-way catalytic converter 21 and which captures a residual oxygen content in the exhaust gas and the measuring signal MS1 of which is characteristic of the air/fuel ratio in the combustion chamber of the cylinder Z1 and upstream of the first exhaust gas probe prior to oxidation of the fuel, referred to below as the air/fuel ratio in the cylinders Z1-Z4. The first exhaust gas probe 42 can be disposed in the three-way catalytic converter 21 in such a manner that a part of the catalytic converter volume is located upstream of the first exhaust gas probe 42.

The first exhaust gas probe 42 can be a linear lambda probe or a binary lambda probe.

Also disposed downstream of the three-way catalytic converter 21 is preferably a second exhaust gas probe 44, which is deployed particularly within the scope of trim controlling and is preferably embodied as a simple binary lambda probe.

Depending on how the invention is specifically embodied, any subset of the cited sensors can be present or additional sensors can also be present.

The actuators are, for example, the throttle valve 5, the gas inlet and gas outlet valves 12, 13, the injection valve 18 or the spark plug 19.

In addition to the cylinder Z1, yet further cylinders Z2 to Z4 are preferably also provided to which corresponding actuators and sensors are then optionally also assigned.

Figure 2:
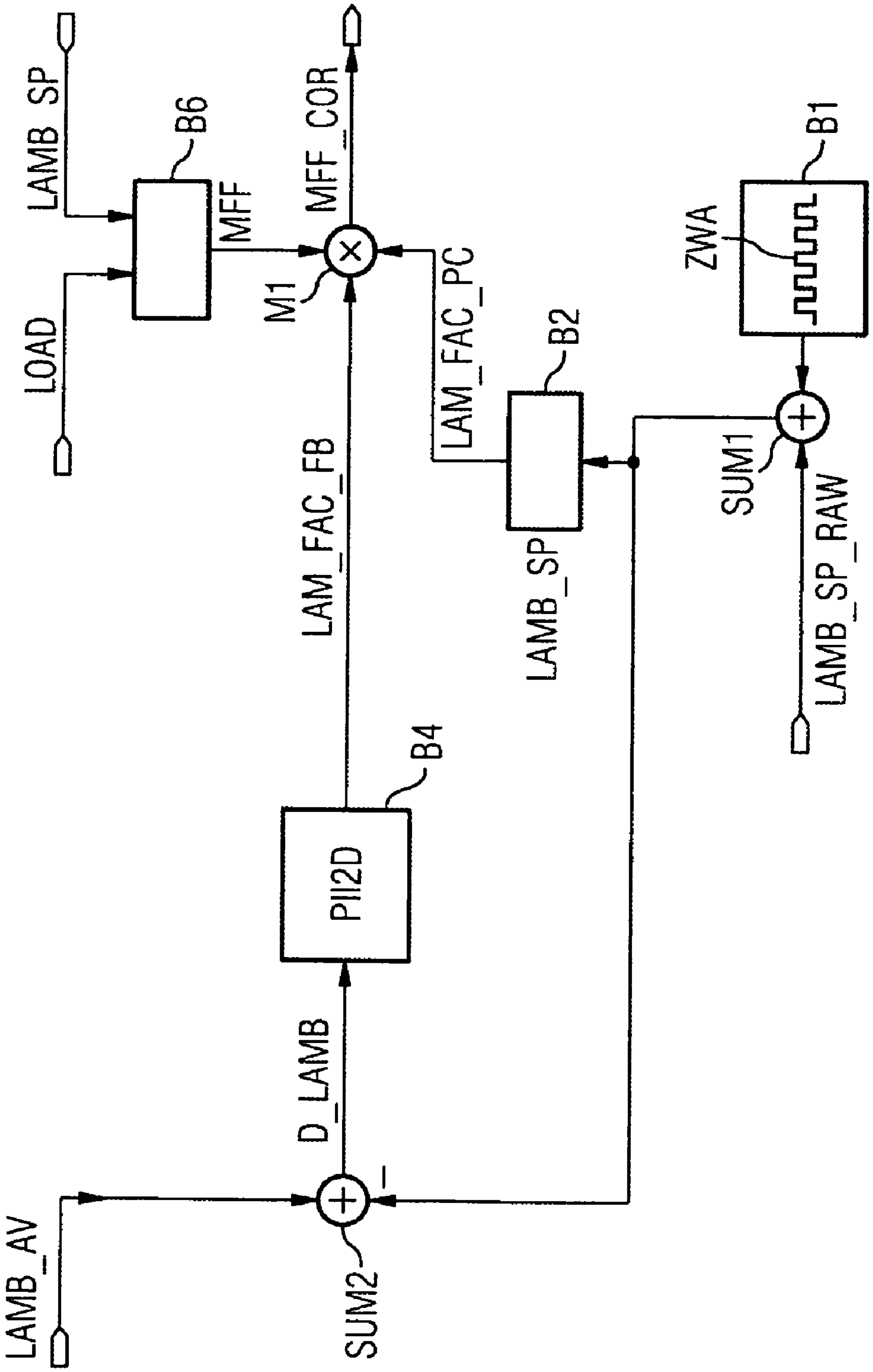
FIG. 2 shows a block diagram of a part of the control device of the internal combustion engine in a first embodiment.

A block diagram of a part of the control device 25 according to a first embodiment is shown in FIG. 2. In a particularly simple embodiment a predetermined setpoint value LAMB_SP_RAW of the air/fuel ratio can be permanently predetermined.

However it is preferably determined for example as a function of the current operating mode of the internal combustion engine, such as a homogeneous or shift mode and/or as a function of operating variables of the internal combustion engine. The setpoint value LAMB_SP_RAW of the air/fuel ratio can in particular be predetermined as being approximately the stoichiometric air/fuel ratio.

A forced excitation signal ZWA is determined in a block B1 and the setpoint value LAMB_SP_RAW of the air/fuel ratio is modulated with the forced excitation signal ZWA at the first summing position SUM1. The forced excitation signal ZWA is a square-wave signal having an amplitude AMP_ZWA. The output variable of the summing position is then a predetermined air/fuel ratio LAMB_SP in the combustion chambers of the cylinders Z1 to Z4. The predetermined air/fuel ratio LAMB_SP is supplied to a block B2, which contains a precontroller and generates a lambda precontrol factor LAMB_FAC_PC as a function of the predetermined air/fuel ratio LAMB_SP.

At a second summing position SUM2 a control difference D_LAMB which is the input variable to a block 54 is determined as a function of the predetermined air/fuel ratio LAMB_SP and the captured air/fuel ratio LAMB_AV, optionally corrected by a trim controller intervention, by forming a difference. A linear lambda regulator is configured in the block B4, preferably as a $PII^2D$ regulator. The manipulated variable of the linear lambda regulator of the block B4 is a lambda regulating factor LAM_FAC_FB. Determination of the captured air/fuel ratio LAMB_AV is described in more detail further below with reference to FIGS. 5 to 7.

Reference is made with regard to trim controlling to the technical publication titled “Handbuch Verbrennungsmotor” (appearing in English as “Internal Combustion Engine Handbook”), edited by Richard van Basshuysen and Fred Schäfer, 2nd edition, published by Vieweg & Sohn Verlagsgesellschaft mbH, June 2002, pages 559-561, the content of which is included herein in this connection.

The setpoint value LAMB_SP of the air/fuel ratio can also undergo filtering, which takes into account for example gas travel times or the response of the exhaust gas catalytic converter, before the difference is formed at the summing position S2.

Also provided is a block B6 in which a basic fuel mass MFF to be metered in is determined as a function of a load LOAD, which can be a mass air flow for example and of the modulated setpoint value LAMB_SP. At the multiplying position M1 a fuel mass to be metered in MFF_COR is determined by forming the product of the basic fuel mass MFF to be metered in, the lambda precontrol factor LAM_FAC_PC, and the lambda regulating factor LAM_FAC_FB. The injection valve 18 is then activated accordingly to meter in the fuel mass to be metered in MFF_COR.

Figure 3:
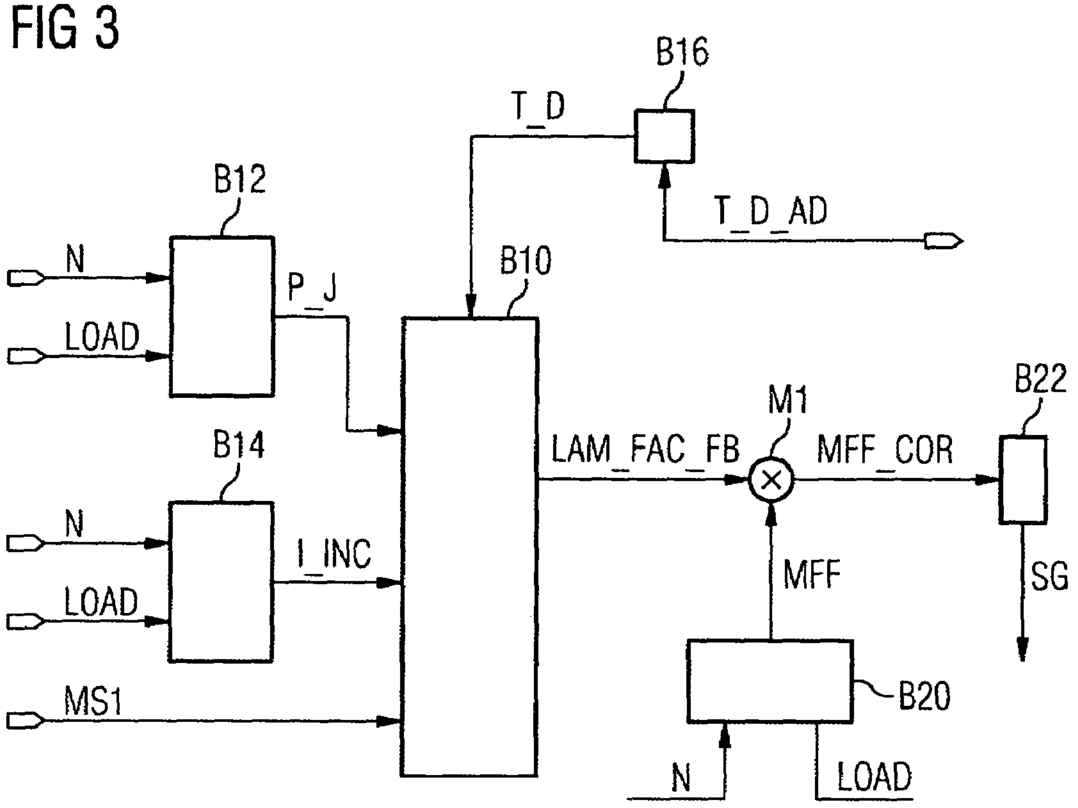
FIG. 3 shows a further block diagram of a part of the control device of the internal combustion engine according to a second embodiment.

A part of the control device 25 in a further embodiment having a binary lambda regulator is explained in more detail with reference to the block diagram shown in FIG. 3.

A block B10 comprises a binary lambda regulator. The measuring signal MS1 of the first exhaust gas probe 42 is supplied to the binary lambda regulator as a controlled variable. In this context the first exhaust gas probe 42 is configured as a binary lambda probe and the measuring signal MS1 is hence essentially binary in nature, in other words it assumes a lean value if the air/fuel ratio in front of the exhaust gas catalytic converter 21 is lean and a rich value if it is rich. Only in a very narrow intermediate range, in other words for example in the case of an exactly stoichiometric air/fuel ratio does it also assume intermediate values between the lean and rich value. Owing to the binary nature of the measuring signal MS1 of said type, the binary lambda regulator is configured as a two-point regulator. The binary lambda regulator is preferably embodied as a PI regulator.

A P component is supplied to the block 310 preferably as a proportional jump P_J. A block B12 is provided in which the proportional jump P_J is determined as a function of the rotational speed N and the load LOAD. An engine characteristic map that can be stored permanently is preferably provided for this purpose.

An I component of the binary lambda regulator is determined preferably as a function of an integral increment I_INC. The integral increment I_INC is preferably determined in a block B14 also as a function of the rotational speed N and the load LOAD. An engine characteristic map for example can likewise be provided for this purpose. The load LOAD can be the mass air flow for example or also the intake pipe pressure for example.

A delay time period T_D determined in a block B 16 preferably as a function of a trim controller intervention is also supplied to the block B10 as an input parameter. The lambda regulating factor LAM_FAC_FB is applied to the output side of the binary lambda regulator. A block B20 corresponds to the block B6 in FIG. 2. An actuating signal SG for the respective injection valve 18 is generated in a block B22 as a function of the fuel mass to be metered in MFF_COR.

Figure 4:
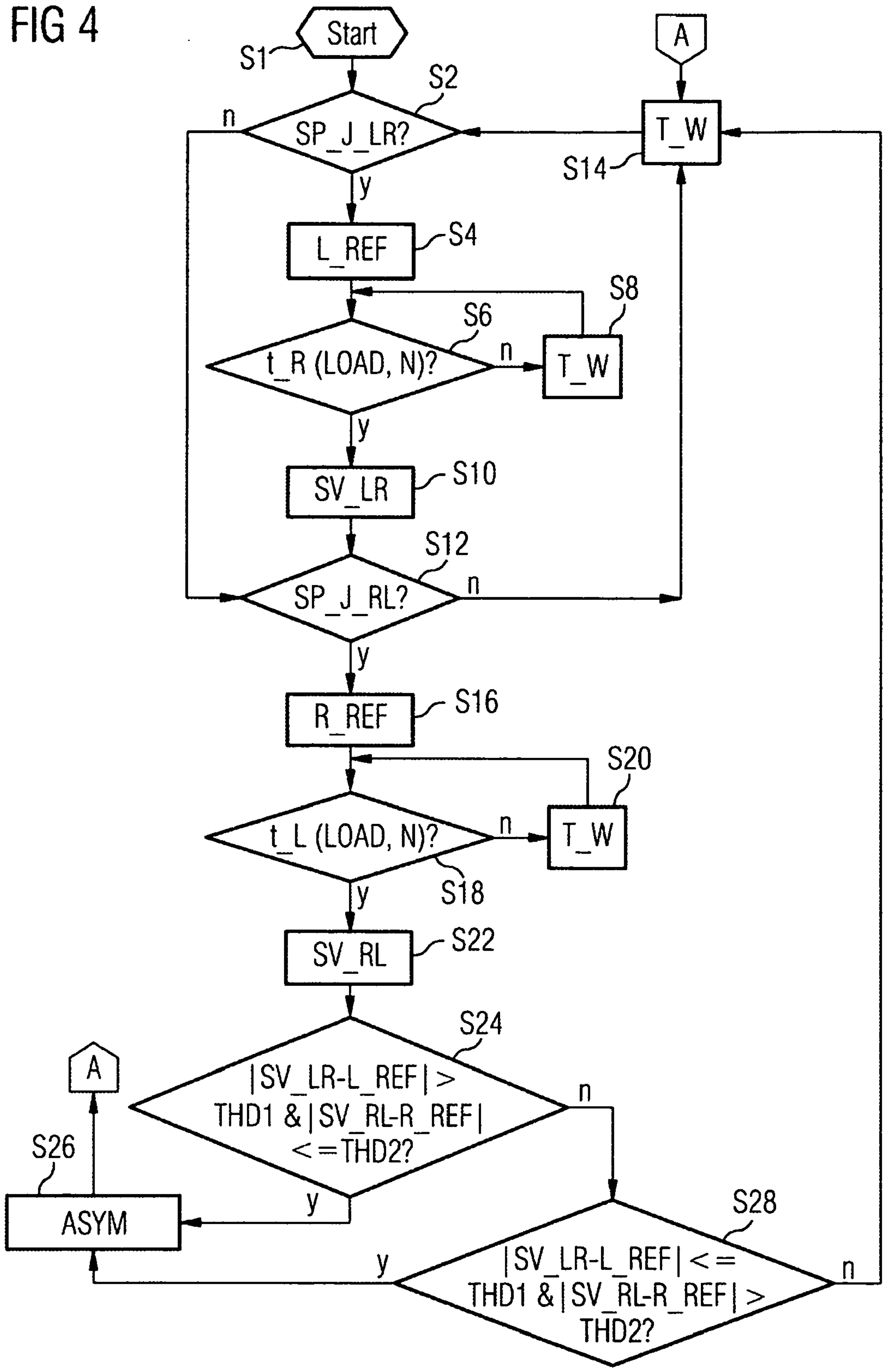
FIG. 4 shows a first flowchart of a program executed in the control device.

A program within the scope of monitoring the exhaust gas probe, in particular the first exhaust gas probe 42, is started in a step S1 (FIG. 4). The program is started and also executed preferably in a stationary operating state of the internal combustion engine and even more preferably also within a predetermined load and/or rotational speed range. However the program is in principle also suitable for monitoring the second exhaust gas probe 44. However for monitoring the second exhaust gas probe 44 an amplitude AMP of the forced excitation signal is preferably suitably increased taking into account the oxygen-storing capacity of the three-way catalytic converter 21.

Variables can also be initialized in step S1.

A check is carried out in a step S2 to determine whether a jump SP_J_LR has taken place in the modulated setpoint value LAMB_SP of the air/fuel ratio from a lean air/fuel ratio to a rich air/fuel ratio. If this is not the case, processing is resumed in a step S12, which is described in more detail further below.

If this is the case however, then in a step S4 a lean reference signal value L_REF is assigned as a function of the measuring signal MS1 to the first exhaust gas probe 42. To this end the assignment takes place in a predeterminable correlation with the jump SP_J_LR of the modulated setpoint value LAMB_SP from a lean air/fuel to a rich air/fuel ratio. This can for example involve assigning a signal value which the first measuring signal MS1 had very shortly before the jump SP_J_LR of the modulated setpoint value LAMB_SP from a lean air/fuel ratio to a rich air/fuel ratio. In this context it is also possible to take into account gas travel times and/or a response of the exhaust gas catalytic converter. Thus a maximum value of the first measuring signal MS1 during the period correlating with a preceding jump SP_J_RL of the modulated setpoint value LAMB_SP from a rich air/fuel ratio to a lean air/fuel ratio until the jump SP_J_LR of the modulated setpoint value LAMB_SP from a lean air/fuel ratio to a rich air/fuel ratio can also be assigned as the lean reference signal value L_REF.

A check is then carried out in a step S6 to determine whether a predetermined lean to rich delay period t_R relating to identification of the jump SP_J_LR of the modulated setpoint value LAMB_SP from a lean air/fuel ratio to a rich air/fuel ratio has expired. The lean to rich delay period t_R is preferably predetermined as a function of a load LOAD and/or the rotational speed N. The load can be represented for example by the mass air flow or intake pipe pressure. Thus the lean to rich delay period t_R can be determined for example as a function of a corresponding engine characteristic map, the values of which are preferably determined empirically.

If the condition of step S6 has not been fulfilled, the program branches to a step S8, where it pauses for a predetermined waiting time period T_W selected as being sufficiently short to insure a desired temporal resolution in the execution of the program. The program can alternatively also pause in step S8 for a predeterminable crankshaft angle. Following on from step S8, processing is resumed again in step S6.

If however the condition of step S6 has been fulfilled, then a lean to rich signal value SV_LR is derived in a step S10 as a function of the current measuring signal MS1 of the first exhaust gas probe.

A check is carried out in a step S12 to determine whether a jump SP_J_RL has taken place in the modulated setpoint value LAMB_SP from a rich air/fuel ratio to a lean air/fuel ratio. If this is not the case, processing is resumed in a step S14, where the program pauses for the predetermined waiting time period T_W corresponding to step S8 before processing is resumed again in step S2. If however the condition of step S12 has been fulfilled, a rich reference signal value R_REF is captured in a step S16 in correlation with the jump SP_J_RL of the modulated setpoint value LAMB_SP from a rich air/fuel ratio to a lean air/fuel ratio. This preferably takes place in the same manner as the process according to step S4, with a corresponding minimum value then having to be set with regard to the embodiment variant in respect of the maximum value.

A check is then carried out in a step S18 to determine whether a rich to lean delay period t_L has elapsed since identification of the jump SP_J_RL of the modulated setpoint value LAMB_SP from a rich air/fuel ratio to a lean air/fuel ratio. The rich to lean delay period t_L is preferably likewise determined as a function of the load LOAD and/or the rotational speed N and can likewise preferably be determined as a function of an engine characteristic map.

If the condition of step S18 has not been fulfilled, the program pauses for the predetermined waiting time period T_W in a step S20 before processing is resumed again in step S18.

If however the condition of step S18 has been fulfilled, a rich to lean signal value SV_RL is determined in a step S22 as a function of the current measuring signal MS1 of the first exhaust gas probe 42.

In a step S24 the lean to rich signal value SV_LR and the rich to lean signal value SV_RL are related to the lean reference signal value L_REF or the rich reference signal value R_REF, which is preferably done by forming corresponding amounts of corresponding differences, as also indicated in step S24. A check is also thus carried out in step S24 to determine whether the related lean to rich signal value is greater than a predetermined lean to rich threshold value THD 1 and the related rich to lean signal value is smaller than or equal to a predetermined rich to lean threshold value. The lean to rich and rich to lean threshold values THD1, THD2 can be determined on the basis of trials for example or else on the basis of simulations or in another suitable manner. A respectively smaller amount of the related lean to rich signal values as well as of the rich to lean signal values here characterizes a delayed response of the exhaust gas probe, which can be due to a delay in the jump response and/or a reduced slope steepness of the measuring signal MS1. The lean to rich and the rich to lean threshold values THD 1, THD 2 can in principle also assume identical values.

If the condition of step S24 has been fulfilled, an asymmetrical aging ASYM of the first exhaust gas probe 42 is identified in a step S26.

If however the condition of step S24 has not been fulfilled, then a check is carried out in a step S28 to determine whether the related lean to rich signal value is smaller than or equal to the lean to rich threshold value THD 1 and the related rich to lean signal value is greater than the rich to lean threshold value THD 2. If this is the case, an asymmetrical aging ASYM of the first exhaust gas probe 42 is likewise identified in step S26. This can then be used for diagnostic purposes and can optionally result in a fault input for further evaluation. Adjustment within the scope of lambda regulation can however alternatively also take place as a function thereof.

If however the condition of step S28 has not been fulfilled, processing is resumed in step S14.

Figure 5:
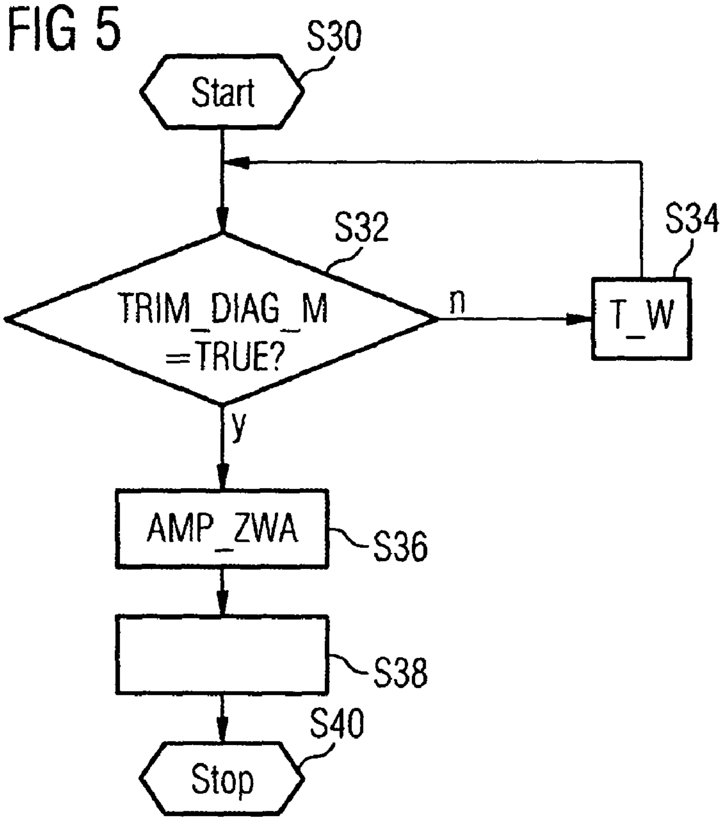
FIG. 5 shows a second flowchart of a further program executed in the control device.

Explained with reference to FIG. 5 is a further program, which allows a two-stage monitoring of the first exhaust gas probe 42. The program is started in a step S30 which can be close in time to an engine start for example. A check is carried out in a step S32 to determine whether a suspicion marker TRIM_DIAG_M for an asymmetrical aging ASYM of the first exhaust gas probe 42 has been allocated a true value TRUE. If this is not the case, in other words the suspicion marker TRIM_DIAG_M has been allocated a false value, processing is resumed in a step S34, where the program pauses for the predetermined waiting time period T_W before processing is resumed again in step S32.

The suspicion marker TRIM_DIAG_M is allocated either the true value TRUE or the false value as a function of a trim controller diagnosis. In particular a size of an integral component of the trim controller intervention is evaluated for this purpose within the scope of the trim controller diagnosis. The amount and sign of the integral component of the trim controller intervention are a function inter alia of an extent and direction of the asymmetrical aging ASYM of the first exhaust gas probe 42.

If the condition of step S32 has been fulfilled, the amplitude AMP_ZWA of the forced excitation signal ZWA is preferably increased in a step S36 compared with an operation external to the performance of monitoring the first exhaust gas probe 42. The program according to FIG. 4 is then executed in a step S38. The program can then be terminated in a step S40 or is resumed in step S34.

If the condition of step S32 has been fulfilled, processing can alternatively also be resumed directly in step S38. The amplitude AMP_ZWA of the forced excitation signal ZWA can furthermore also be increased accordingly during the processing of step S1. Even greater selectivity and robustness in the performance of monitoring the first exhaust gas probe can be insured in this manner. Since however increasing the amplitude AMP_ZWA of the forced excitation signal ZWA may be associated with increased raw pollutant emissions, the procedure according to FIG. 5 is particularly advantageous as in this context the amplitude AMP_ZWA of the forced excitation signal ZWA is increased only if the suspicion marker TRIM_DIAG_M for an asymmetrical aging ASYM has already been allocated the true value TRUE and there is therefore an increased probability of an asymmetrical aging ASYM. The asymmetrical aging ASYM can also be identified very soon after its occurrence in this manner.

The programs according to FIGS. 4 and 5 are preferably executed in conjunction with linear lambda regulation as described in more detail with reference to the block diagram in FIG. 2. They can however also be suitably adjusted and executed externally to linear lambda regulation, for example during quantity controlling of the air/fuel mixture, as is the case for instance during shift mode in the case of a gasoline engine or in the case of a diesel engine. In this case the jump (SP_J_LR) of the modulated setpoint value (LAMB_SP) from a lean air/fuel ratio to a rich air/fuel ratio is then generally replaced by a jump of the variable influencing the air/fuel ratio from a leaner air/fuel ratio to a richer air/fuel ratio. The jump (SP_J_RL) of the modulated setpoint value (LAMB_SP) from a rich air/fuel ratio to a lean air/fuel ratio is furthermore generally replaced by a jump of the variable influencing the air/fuel ratio from a richer air/fuel ratio to a leaner air/fuel ratio. The variable influencing the air/fuel ratio can be the fuel mass to be metered in or else the mass air flow or the intake pipe pressure for example.

The corresponding programs according to FIGS. 6 and 7 described below are preferably executed in conjunction with a binary lambda regulation according to FIG. 3.

The steps of the program according to FIG. 6 correspond in principle to those of the program according to FIG. 4, with in particular the differences being described below.

The program is started in a step S50 corresponding to step S1.

A check is carried out in a step S52, which in principle corresponds to step S2, to determine whether a jump SG_LAM_BIN_J_LR has taken place in the actuating signal of the binary lambda regulator from a lean air/fuel ratio to a rich air/fuel ratio. If this is not the case, processing is resumed in a step S62. The actuating signal of the binary lambda regulator is preferably the lambda regulating factor LAM_FAC_FB.

If however the condition of step S52 has been fulfilled, then processing is resumed in a step S54, which corresponds to step S4. Steps S56, S58, and S60 correspond in a similar manner to steps S6, S8, and S10.

Step S62 differs from step S12 in that a check is carried out to determine whether a jump SG_LAM_BIN_J_RL has taken place in the actuating signal of the binary lambda regulator from a rich air/fuel ratio to a lean air/fuel ratio. If this is not the case, processing is resumed in a step S64, which corresponds to step S14. If however the condition of step S62 has been fulfilled, processing is resumed in steps S66, S68, optionally S70, S72, S74, S76, and S78, which correspond to steps S16, S18, S20, S22, S24, S26, and S28.

Figure 6:
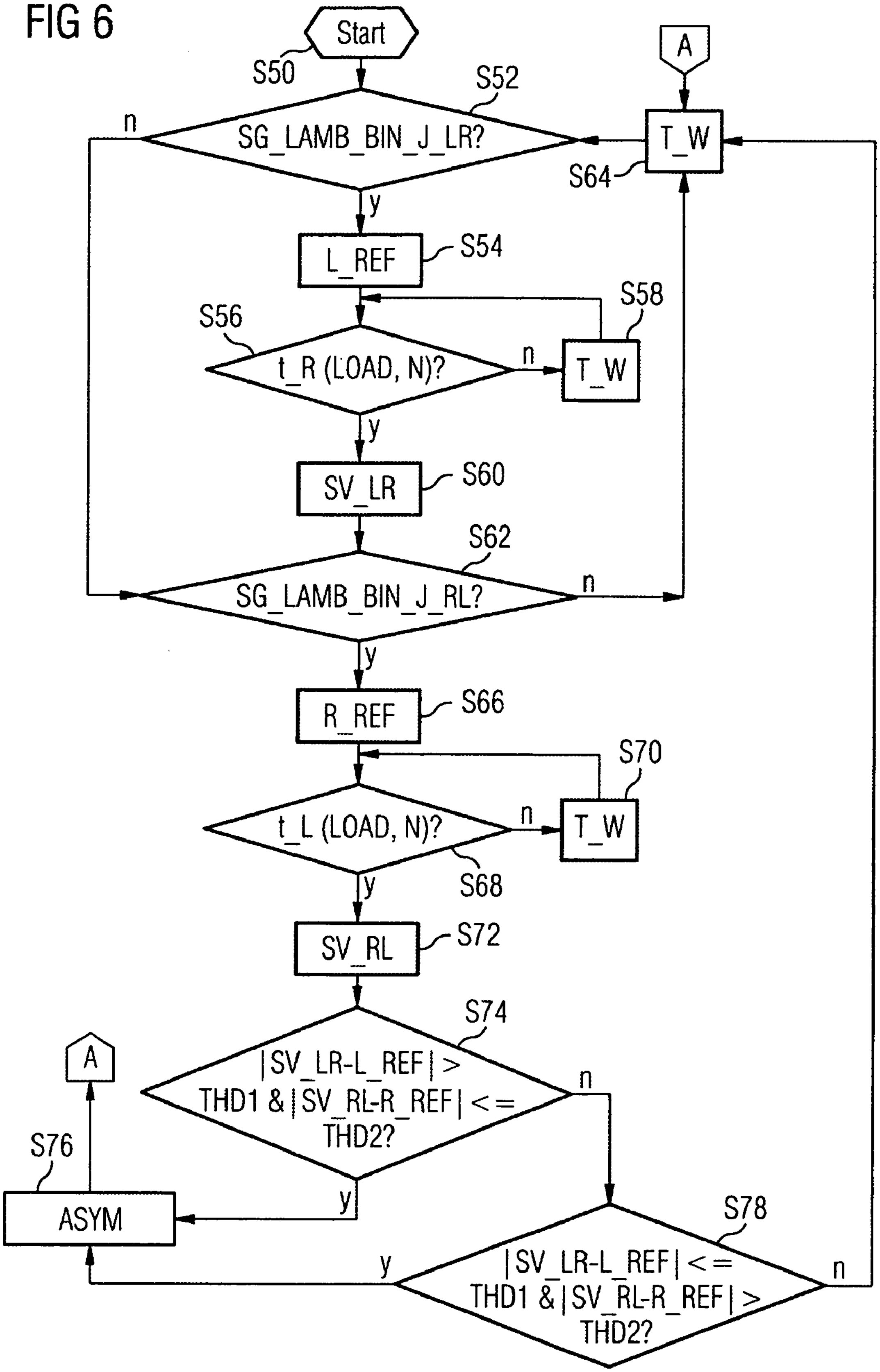
FIG. 6 shows a further flowchart of a further program executed in the control device.

The program according to FIG. 6 is in principle also suitable for corresponding monitoring of the second exhaust gas probe 44. However for monitoring the second exhaust gas probe 44 at least one of the control parameters of the binary lambda regulator is preferably suitably adjusted taking account of the oxygen-storing capacity of the three-way catalytic converter 21.

Figure 7:
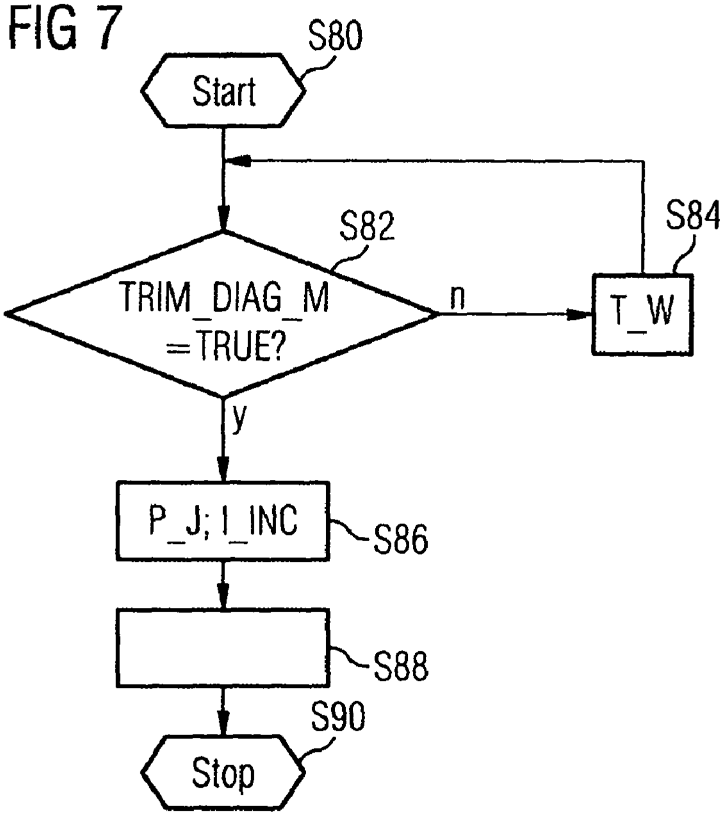
FIG. 7 shows yet a further flowchart of a further program executed in the control device.

The program according to FIG. 7 corresponds in principle to the one shown in FIG. 5. The differences are examined below. Steps S80 to S90 correspond to steps S30 to S40. In step S86, in contrast to step S36, at least one of the control parameters of the binary lambda regulator is changed to carry out the steps according to the program shown in FIG. 6. In this context the proportional jump T_J is preferably increased and the integral increment I_INC also preferably reduced compared with normal operation, during which no monitoring of the second exhaust gas probe is performed. The program shown in FIG. 6 is executed in step S88.

Figure 8:
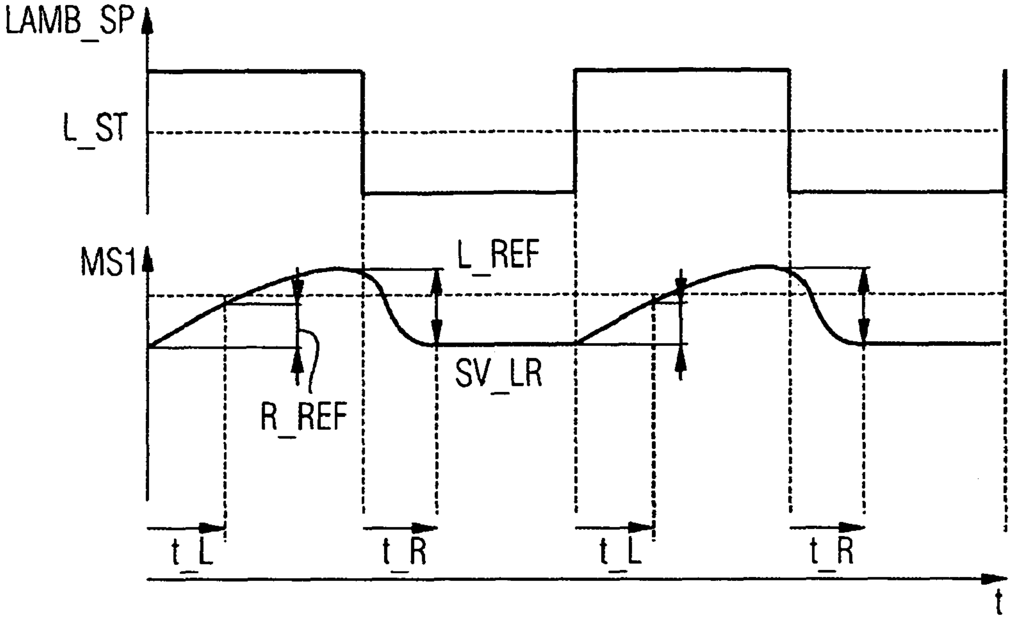
FIG. 8 shows first curves plotted over the time t.
Figure 9:
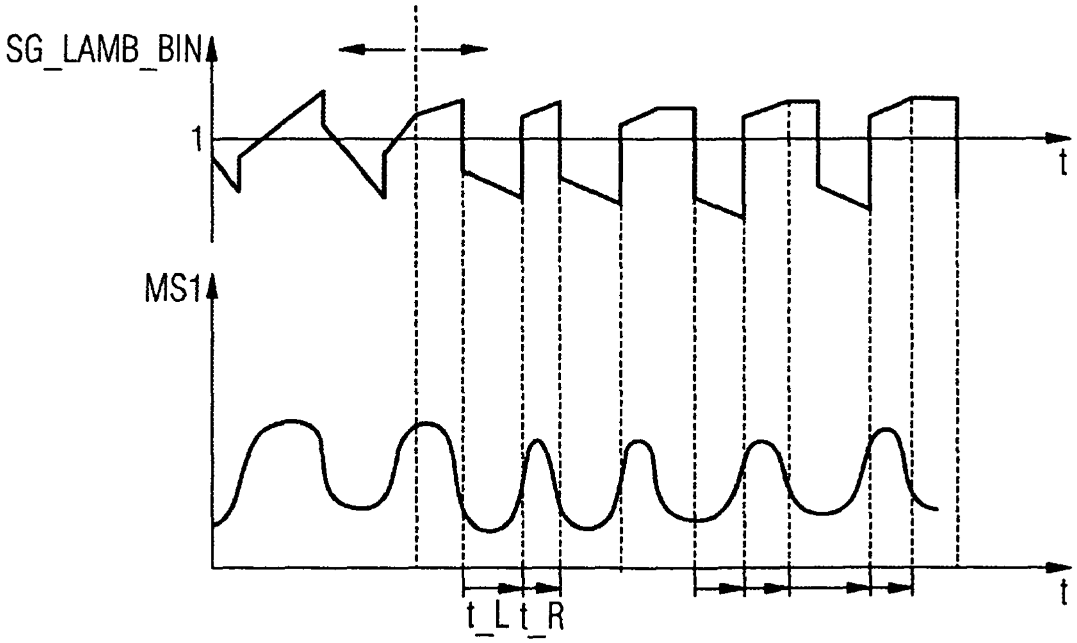
FIG. 9 shows second curves plotted over the time t.

Signal curves are also described with reference to FIGS. 8 and 9. FIG. 8 corresponds to signal curves in conjunction with linear lambda regulation during execution of the program shown in FIG. 4. FIG. 9 corresponds to corresponding signal curves during binary lambda regulation in conjunction with the execution of the program shown in FIG. 6.

The programs shown in FIGS. 5 and 7 are also suitable in principle for monitoring the second exhaust gas probe 44 in respect of asymmetrical aging ASYM.

The invention claimed is:

1. A method for monitoring an exhaust gas probe, which is disposed in an exhaust gas tract of an internal combustion engine, the method comprising the steps of:

in relation to a jump of a variable influencing an air/fuel ratio from a leaner air/fuel ratio to a richer air/fuel ratio, capturing a measuring signal of the exhaust gas probe after a predetermined lean to rich delay period as a lean to rich signal value and relating the measuring signal of the exhaust gas probe to a lean reference signal value, which is captured in correlation with the jump of the variable influencing the air/fuel ratio from a leaner air/fuel ratio to a richer air/fuel ratio, in relation to a jump of the variable influencing an air/fuel ratio from a richer air/fuel ratio to a leaner air/fuel ratio, capturing a measuring signal of the exhaust gas probe after a predetermined rich to lean delay period as a rich to lean signal value and relating the measuring signal of the exhaust gas probe to a rich reference signal value, which is captured in correlation with the jump of the variable influencing the air/fuel ratio from a richer air/fuel ratio to a leaner air/fuel ratio, and identifying either an asymmetrically aged or a non-asymmetrically aged exhaust gas probe as a function of the related lean to rich and rich to lean signal values.

2. The method according to claim 1, wherein the related lean to rich and rich to lean signal values are compared with at least one of predetermined lean to rich and rich to lean threshold values and either an asymmetrically aged or a non-asymmetrically aged exhaust gas probe is identified as a function of the comparisons.

3. The method according to claim 1, wherein the lean to rich delay period and the rich to lean delay period are predetermined as a function of at least one of a load and a rotational speed.

4. The method according to claim 1, wherein at least one of the lean to rich and rich to lean threshold values are determined as a function of the respective height of at least one of the jump of the variable influencing the air/fuel ratio from a leaner air/fuel ratio to a richer air/fuel ratio and the jump of the variable influencing the air/fuel ratio from a richer air/fuel ratio to a leaner air/fuel ratio.

5. The method according to claim 1, wherein a setpoint value of the air/fuel ratio in a combustion chamber is modulated by means of a forced excitation signal, a mass of fuel to be metered in is determined in the context of a lambda regulation as a function of the modulated setpoint value and an injection valve is activated according to the mass of fuel to be metered in the jump of the variable influencing the air/fuel ratio from a leaner air/fuel ratio to a richer air/fuel ratio is a jump of the modulated setpoint value from a lean air/fuel ratio to a rich air/fuel ratio, the jump of the variable influencing the air/fuel ratio from a richer air/fuel ratio to a leaner air/fuel ratio is a jump of the modulated setpoint value from a rich air/fuel ratio to a lean air/fuel ratio.

6. The method according to claim 1, wherein as a function of a trim controller diagnosis, a suspicion marker for an asymmetrical aging of the exhaust gas probe is allocated either a true value or a false value and if the suspicion marker has the true value, the steps of capturing and relating the lean to rich and rich to lean signal values and as a function of this identifying an asymmetrically aged or a non-asymmetrically aged exhaust gas probe are carried out.

7. The method according to claim 1, wherein an amplitude of the forced excitation signal is increased to carry out the steps of capturing and relating the lean to rich and rich to lean signal values.

8. A method for monitoring an exhaust gas probe, which is disposed in an exhaust gas tract of an internal combustion engine, the method comprising the steps of:

determining a mass of fuel to be metered in as a function of the actuating signal of a binary lambda regulator and activating the injection valve according to the mass of fuel to be metered in, in relation to a jump of the actuating signal of the binary lambda regulator from a lean air/fuel ratio to a rich air/fuel ratio, capturing a signal value of the exhaust gas probe after a predetermined lean to rich delay period as a lean to rich signal value and relating the signal value of the gas exhaust probe to a lean reference signal value, which is captured in correlation with the jump of the actuating signal of the binary lambda regulator from a lean air/fuel ratio to a rich air/fuel ratio, in relation to a jump of the actuating signal of the binary lambda regulator from a rich air/fuel ratio to a lean air/fuel ratio, capturing a signal value of the exhaust gas probe after a predetermined rich to lean delay period as a rich to lean signal value and relating the signal value of the gas exhaust probe to a rich reference signal value of the measuring signal, which is captured in correlation with the jump of the actuating signal of the binary lambda regulator from a rich air/fuel ratio to a lean air/fuel ratio, and identifying either an asymmetrically aged or a non-asymmetrically aged exhaust gas probe as a function of the related lean to rich and rich to lean signal values.

9. The method according to claim 8, wherein the related lean to rich and rich to lean signal values are compared with at least one of predetermined lean to rich and rich to lean threshold values and either an asymmetrically aged or a non-asymmetrically aged exhaust gas probe is identified as a function of the comparisons.

10. The method according to claim 8, wherein the lean to rich delay period and the rich to lean delay period are predetermined as a function of at least one of a load and/or a rotational speed.

11. The method according to claim 8, wherein as a function of a trim controller diagnosis, a suspicion marker for an asymmetrical aging of the exhaust gas probe is allocated either a true value or a false value and if the suspicion marker has the true value, the steps of capturing and relating the lean to rich and rich to lean signal values and as a function of this identifying an asymmetrical aging or a non-asymmetrical aging are carried out.

12. The method according to claim 8, wherein at least one of the control parameters of the binary lambda regulator is changed to carry out the steps of capturing and relating the lean to rich and rich to lean signal values.

13. A device for monitoring an exhaust gas probe, which is disposed in an exhaust gas tract of an internal combustion engine, the device being operable:

in relation to a jump of a variable influencing an air/fuel ratio from a leaner air/fuel ratio to a richer air/fuel ratio, to capture a measuring signal of the exhaust gas probe after a predetermined lean to rich delay period as a lean to rich signal value and to relate the signal value of the gas exhaust probe to a lean reference signal value, which is captured in correlation with the jump of the variable influencing the air/fuel ratio from a leaner air/fuel ratio to a richer air/fuel ratio, in relation to a jump of the variable influencing an air/fuel ratio from a richer air/fuel ratio to a leaner air/fuel ratio, to capture a measuring signal of the exhaust gas probe after a predetermined rich to lean delay period as a rich to lean signal value and to relate the signal value of the gas exhaust probe to a rich reference signal value, which is captured in correlation with the jump of the variable influencing the air/fuel ratio from a richer air/fuel ratio to a leaner air/fuel ratio, and to identify either an asymmetrically aged or a non-asymmetrically aged exhaust gas probe as a function of the related lean to rich and rich to lean signal values.

14. The device according to claim 13, wherein the related lean to rich and rich to lean signal values are compared with at least one of predetermined lean to rich and rich to lean threshold values and either an asymmetrically aged or a non-asymmetrically aged exhaust gas probe is identified as a function of the comparisons.

15. The device according to claim 13, wherein the lean to rich delay period and the rich to lean delay period are predetermined as a function of at least one of a load and a rotational speed.

16. The device according to claim 13, wherein at least one of the lean to rich and rich to lean threshold values are determined as a function of the respective height of at least one of the jump of the variable influencing the air/fuel ratio from a leaner air/fuel ratio to a richer air/fuel ratio and the jump of the variable influencing the air/fuel ratio from a richer air/fuel ratio to a leaner air/fuel ratio.

17. The device according to claim 13, wherein a setpoint value of the air/fuel ratio in a combustion chamber is modulated by means of a forced excitation signal, a mass of fuel to be metered in is determined in the context of a lambda regulation as a function of the modulated setpoint value and an injection valve is activated according to the mass of fuel to be metered in, the jump of the variable influencing the air/fuel ratio from a leaner air/fuel ratio to a richer air/fuel ratio is a jump of the modulated setpoint value from a lean air/fuel ratio to a rich air/fuel ratio, the jump of the variable influencing the air/fuel ratio from a richer air/fuel ratio to a leaner air/fuel ratio is a jump of the modulated setpoint value from a rich air/fuel ratio to a lean air/fuel ratio.

18. The device according to claim 13, wherein as a function of a trim controller diagnosis, a suspicion marker for an asymmetrical aging of the exhaust gas probe is allocated either a true value or a false value and if the suspicion marker has the true value, the steps of capturing and relating the lean to rich and rich to lean signal values and as a function of this identifying an asymmetrically aged or a non-asymmetrically aged exhaust gas probe are carried out.

19. The device according to claim 13, wherein an amplitude of the forced excitation signal is increased to carry out the steps of capturing and relating the lean to rich and rich to lean signal values.

20. A device for monitoring an exhaust gas probe, which is disposed in an exhaust gas tract of an internal combustion engine, the device being operable:

to determine a mass of fuel to be metered in as a function of the actuating signal of a binary lambda regulator and to activate the injection valve according to the mass of fuel to be metered in, in relation to a jump of the actuating signal of the binary lambda regulator from a lean air/fuel ratio to a rich air/fuel ratio, to capture a signal value of the exhaust gas probe after a predetermined lean to rich delay period as a lean to rich signal value and to relate the signal value of the gas exhaust probe to a lean reference signal value, which is captured in correlation with the jump of the actuating signal of the binary lambda regulator from a lean air/fuel ratio to a rich air/fuel ratio, in relation to a jump of the actuating signal of the binary lambda regulator from a rich air/fuel ratio to a lean air/fuel ratio, to capture a signal value of the exhaust gas probe after a predetermined rich to lean delay period as a rich to lean signal value and to relate the signal value of the gas exhaust probe to a rich reference signal value of the measuring signal, which is captured in correlation with the jump of the actuating signal of the binary lambda regulator from a rich air/fuel ratio to a lean air/fuel ratio, and to identify either an asymmetrically aged or a non-asymmetrically aged exhaust gas probe as a function of the related lean to rich and rich to lean signal values.

* * * * *